No. 664,126.  
J. W. COWAN.  
DENTAL FLOSS HOLDER.  
(Application filed Oct. 10, 1900.)  
(No Model.)
Patented Dec. 18, 1900.
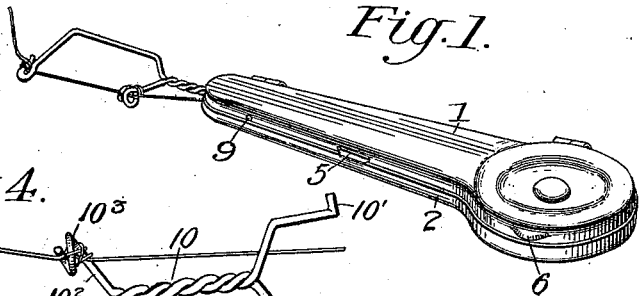
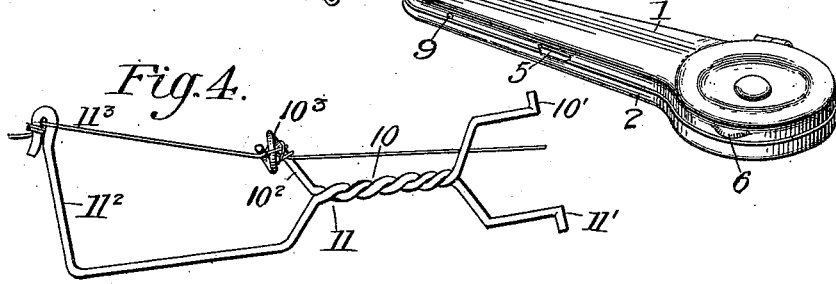
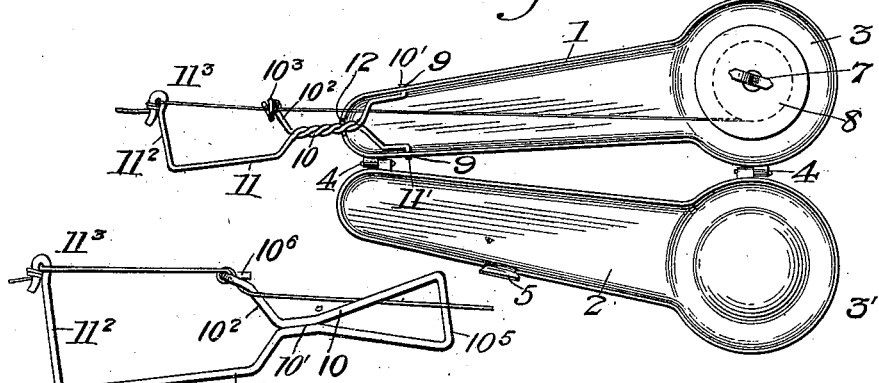
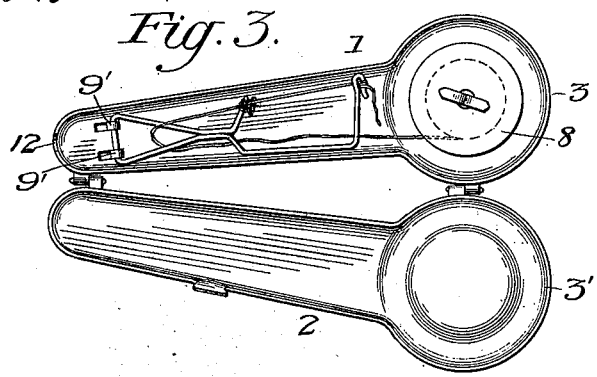
Witnesses:  
D. W. Edelin.  
J. E. Hutchinson Jr.
Inventor:  
James W. Cowan  
By his attorneys  
Pennie & Goldsborough
THE NORRIS PETERS CO., PHOTO-LITHO., WASHINGTON, D. C.

UNITED STATES PATENT OFFICE.

JAMES W. COWAN, OF GENESEO, NEW YORK.

DENTAL FLOSS-HOLDER.

SPECIFICATION forming part of Letters Patent No. 664,126, dated December 18, 1900.

Application filed October 10, 1900. Serial No. 32,642. (No model.)

*To all whom it may concern:*

Be it known that I, JAMES W. COWAN, a citizen of the United States, residing at Geneseo, county of Livingston, State of New York, have invented certain new and useful Improvements in Dental Floss-Holders; and I do hereby declare the following to be a full, clear, and exact description of the invention, such as will enable others skilled in the art to which it appertains to make and use the same.

This invention has for its object to provide a new and useful dental appliance for cleaning the spaces between the teeth by means of a filament of dental floss or the like.

The invention comprises a box or casing having a suitable lid or cover, a bobbin or spool of dental floss, thread, or the like revolubly mounted in the casing and a spring-frame carried in the casing, to hold a portion of the floss taut between its arms, which frame is adapted to lie snugly within the casing when not in use and to be projected from the casing and secured in position for use, the whole constituting a simple and effective hand-tool wherein successive lengths of floss may be unwound from the bobbin and securely clamped in the spring-frame without disturbing the relative arrangement of the several parts of the appliance.

The preferred form of my invention is illustrated in the accompanying drawings, in which—

Figure 1 is a perspective view of my appliance in condition for use. Fig. 2 is a plan view showing the spring-frame in its outer or operative position. Fig. 3 is a similar view of a modified form, showing the spring-frame folded back in the casing. Fig. 4 is an enlarged detail of the spring-frame, illustrating the manner of securing the floss therein. Fig. 5 is a similar view of the modified spring-frame shown in Fig. 3.

Referring to the drawings Figs. 1 and 2, 1 represents a casing preferably formed of sheet metal, having a tapering body portion terminating in a circular head 3. A cover or lid 2 having the general configuration of the casing 1 is likewise provided with a circular head 3' and is secured to the casing by hinges
4. This cover or lid is adapted to be securely locked to the casing when closed by a spring-catch 5, struck from the body of the lid, the sharp edge of said catch forming a cutter. Revolubly mounted in the center of the head 3 is a stud or pintle 7, having its inner end split, as shown, which is adapted to receive and removably support a retainer, spool, or bobbin 8 of dental floss, thread, or the like. This bobbin in its usual form comprises a central hollow spindle or support flanked by two disks or faces, between which the thread is held. Pivoted in the forward end of the casing in suitable orifices 9 is a spring-frame formed of two sections of wire 10 and 11, provided with lateral bends 10' and 11', forming journals which engage said orifices. The wires 10 and 11 are twisted together for a portion of their respective lengths to provide a stiff body or shank for the frame. The outer end of branch 10 has a lateral bend or arm $10^2$, terminating in a spiral or pigtail $10^3$, which constitutes a self-threading eye. Branch 11 beyond the soldered joint has a horizontal reach terminating in a lateral arm $11^2$, provided with a terminal spring-hook $11^3$.

The casing 1 has an orifice 12, through which the twisted portion or shank of the spring-frame passes and in which it is securely held by the cover when the parts are in operative position.

In the modification shown in Fig. 3 the spring-frame is formed of a single piece of wire, with a straight reach $10^5$ in the rear of the soldered portion $10^7$, which journals in bearings formed by two lugs 9', struck up from the bottom of the casing and bent around portion $10^5$.

Fig. 5 illustrates the type of frame shown in position in Fig. 3, with a modified form of thread-retaining means on the arm $10^2$. This retaining means consists of a spring-hook $10^6$, disposed in a plane at right angles to the plane of the frame and formed by bending the end of arm 10 sharply to one side and then toward the rear or shank of the frame. This forms a simple and effective clamp for the thread, which is preferably brought under arm $10^2$ and drawn securely into the throat of the hook, as illustrated. It is obvious that the spring-frame thus constructed is adapted for use with suitable lengths of thread or floss without the provision of a casing, as the portion of the frame to the rear of the soldered portion forms an effective handle.

The device is assembled and operated as follows: A bobbin or spool of floss is slipped over the stud 7, the ends of which are then bent outward to secure the spool in position in the case. A suitable length of floss is unwound from the spool and drawn outward through the opening 12 to the eye or pigtail $10^3$, under which it is slipped, thus threading the floss through the eye. It is then turned backward from the eye and wrapped two or more times about the wire below the eye and brought forward over the end of the pigtail. The end of the floss is then stretched taut and carried with two or more turns through the hook $11^3$ on end of branch 11. The hook $11^3$ has a small throat, and by forcing several turns into it the floss is securely held and the section between the eye $10^3$ and the hook $11^3$ retained under tension.

With the form shown in Fig. 5 the thread is carried under the arm $10^2$ and forced with two or more turns into the throat of the spring-hook $10^6$, after which it is stretched and secured to the other arm $11^2$, as before described.

When the appliance is not in use, the spring-frame is turned back into the casing, in which it snugly fits, as shown in Fig. 3, and the box securely closed, thereby preventing injury to the parts and excluding dust and dirt from the floss and at the same time providing a neat and compact implement that may be carried in the pocket.

When in use, the spring-frame, which has been properly strung with floss in the manner described, is turned on its pivots to the position shown in Fig. 2, after which the cover 2 is closed, thereby locking the parts securely in position. The case is then grasped as a handle and the taut stretch of floss inserted in the interdental spaces and drawn backward and forward to remove all foreign matter lodged between the teeth. To supply a fresh portion of the floss between the ends of the spring-frame, the wrappings are cast off from hook $11^3$ and eye $10^3$ and a fresh length unwound from the bobbin, which is secured to the frame as before. The used end of the floss may be cut off as desired by bringing it against the sharp lateral edge of the spring-catch 5 before stretching the new section in the spring-frame.

When the floss is exhausted, the empty spool is removed by bending up the ends of the split stud and slipping the old spool off and replacing it on the stud by a full spool, after which the ends of the stud are bent outward as before.

Having thus described my invention, what I claim is—

1. A dental appliance comprising a hollow casing, a cover therefor, a thread-retainer mounted therein, a spring-frame in which the thread is stretched projecting from the casing, and means connecting the casing and the frame whereby the latter may be inclosed in the casing.

2. A dental appliance comprising a hollow casing, a cover therefor, a thread-retainer mounted therein, a spring-frame in which the thread is stretched, a pivotal connection between the casing and the frame, whereby the frame may be inclosed within the casing, and means to secure the frame in operative position in the casing.

3. A dental appliance comprising a hollow casing, a cover therefor, a thread-retaining spool rotatably mounted in said casing, a spring-frame mounted in said casing, means on said frame for securing the thread whereby it is held taut in said frame.

4. A dental appliance comprising a hollow casing, a cover therefor, a thread-retaining spool rotatably mounted in said casing, a spring-frame pivotally mounted in said casing, and spring-hooks on said frame whereby the thread is held taut in said frame, said frame being locked between the casing and the cover when in operative position and inclosed in said casing when not in use.

5. A dental appliance comprising a casing, a cover hinged thereto, a thread-retainer in said casing, a spring-frame, in which the cord is stretched, carried by said casing, and a catch on said cover, said catch having a cutting edge.

In testimony whereof I affix my signature in presence of two witnesses.

JAMES W. COWAN.

Witnesses:
J. A. GOLDSBOROUGH,
J. E. HUTCHINSON, Jr.